United States Patent
Matsui et al.

(10) Patent No.: US 9,638,324 B2
(45) Date of Patent: May 2, 2017

(54) SEALING DEVICE

(71) Applicant: NOK CORPORATION, Tokyo (JP)

(72) Inventors: Hiroki Matsui, Fukushima (JP); Shiho Sato, Fukushima (JP)

(73) Assignee: NOK Corporation (JP)

( * ) Notice: Subject to any disclaimer, the term of this patent is extended or adjusted under 35 U.S.C. 154(b) by 0 days.

(21) Appl. No.: 14/417,923

(22) PCT Filed: Jul. 25, 2013

(86) PCT No.: PCT/JP2013/070133
§ 371 (c)(1),
(2) Date: Jan. 28, 2015

(87) PCT Pub. No.: WO2014/021179
PCT Pub. Date: Feb. 6, 2014

(65) Prior Publication Data
US 2015/0285379 A1    Oct. 8, 2015

(30) Foreign Application Priority Data

Jul. 30, 2012 (JP) .................................. 2012-168105

(51) Int. Cl.
*F16J 15/00* (2006.01)
*F16J 15/3264* (2016.01)
(Continued)

(52) U.S. Cl.
CPC .......... *F16J 15/002* (2013.01); *F16J 15/3204* (2013.01); *F16J 15/3264* (2013.01); *F16J 15/447* (2013.01)

(58) Field of Classification Search
CPC ...... F16J 15/002; F16J 15/3204; F16J 15/447; F16J 15/3264
(Continued)

(56) References Cited

U.S. PATENT DOCUMENTS 4,106,781 A  *  8/1978  Benjamin ............ F16J 15/3264
                                                  277/353
4,448,426 A  *  5/1984  Jackowski ........... F16J 15/3256
                                                  277/353
(Continued)

FOREIGN PATENT DOCUMENTS

CN          1934379 A       3/2007
CN        102575774 A       7/2012
(Continued)

OTHER PUBLICATIONS

Extended European Search Report for Patent Application No. EP 13825831.4 dated Sep. 14, 2015 (7 pages).

*Primary Examiner* — Kristina Fulton
*Assistant Examiner* — Nathan Cumar
(74) *Attorney, Agent, or Firm* — Harness, Dickey & Pierce, P.L.C.

(57) ABSTRACT

The invention provides a sealing device constructed by combination of a slinger and a lip member, the sealing device being capable of improving a sealing performance, particularly a sealing performance against external dusts. In order to achieve the object, in a sealing device having a slinger which is installed to one member among relatively rotating two members, a lip member which is installed to the other member, and structured such that the slinger integrally has a tubular portion which is fitted to the one member and a flange portion which extends in a diametrical direction, and the lip member having an end face lip which slidably comes into close contact with the flange portion, a bent portion protruding in an axial direction toward the lip member is provided in the flange portion, and a labyrinth structure having a minute gap is provided between the bent portion and the lip member.

4 Claims, 3 Drawing Sheets

(51) Int. Cl.
*F16J 15/3204* (2016.01)
*F16J 15/447* (2006.01)

(58) Field of Classification Search
USPC .................. 277/351, 345, 346, 349–350
See application file for complete search history.

(56) References Cited

U.S. PATENT DOCUMENTS

| | | | |
|---|---|---|---|
| 4,572,516 A * | 2/1986 | Symons | F16J 15/164 277/377 |
| 6,955,358 B2 | 10/2005 | Iwakata et al. | |
| 8,342,535 B2 | 1/2013 | Lattime et al. | |
| 8,585,296 B2 | 11/2013 | Yamaguchi et al. | |
| 2004/0201179 A1 * | 10/2004 | Iwakata | F16J 15/164 277/572 |
| 2009/0127795 A1 | 5/2009 | Lattime et al. | |
| 2010/0194054 A1 | 8/2010 | Nishigaki | |
| 2011/0075958 A1 * | 3/2011 | Yamaguchi et al. | 384/484 |
| 2012/0207417 A1 | 8/2012 | Walter et al. | |
| 2014/0159318 A1 * | 6/2014 | Lattime et al. | 277/412 |

FOREIGN PATENT DOCUMENTS

| | | |
|---|---|---|
| EP | 1729046 A1 | 12/2006 |
| EP | 1890061 A1 | 2/2008 |
| EP | 2287483 A1 | 2/2011 |
| JP | S62-69625 U | 5/1987 |
| JP | S63-128320 U | 8/1988 |
| JP | H02-16863 U | 2/1990 |
| JP | H03-20175 A | 1/1991 |
| JP | H04-27262 U | 3/1992 |
| JP | 2003-262235 A | 9/2003 |
| JP | 2004-316681 A | 11/2004 |
| JP | 2007-177815 A | 7/2007 |
| JP | 2011-503493 A | 1/2011 |
| WO | WO-97-16662 A1 | 5/1997 |
| WO | WO-03-083330 A2 | 10/2003 |
| WO | WO-2009-125734 A1 | 10/2009 |
| WO | WO-2009-145178 A1 | 12/2009 |

* cited by examiner

SEALING DEVICE

CROSS-REFERENCE TO RELATED APPLICATIONS

This application is a 371 U.S. National Stage Application of International Application No. PCT/JP2013/070133 filed on Jul. 25, 2013, and published in Japanese as WO 2014/021179 A1 on Feb. 6, 2014. This application claims priority to Japanese Application No. 2012-168105 filed on Jul. 30, 2012. The entire disclosures of the above applications are incorporated herein by reference.

BACKGROUND OF THE INVENTION

Field of the Invention

The present invention relates to a sealing device according to a sealing technique. The sealing device according to the present invention is used, for example, as an oil seal for rotation in an automobile-related field, or used as an oil seal for rotation in a field of a general purpose machine. Further, the sealing device according to the present invention is preferably used as a seal for an engine in which a lubricating oil exists in the machine.

Description of the Conventional Art

Conventionally, as shown in FIG. 3, there has been known a sealing device (an end face lip type seal) having a slinger 51 which is installed to one member (for example, a spindle 71) among two relatively rotating members, and a lip member 61 which is installed to the other member (for example, a shaft housing, now shown), integrally provided in the former slinger 51 with a tubular portion 52 which is fitted to the one member and a flange portion 53 which extends in a diametrical direction, and provided in the latter lip member 61 with an end face lip 62 which slidably comes into close contact with the flange portion 53.

This kind of sealing device is used in a combination of the slinger 51 and the lip member 61 as mentioned above, has an oil throwing effect on the basis of rotation of the slinger 51 together with the one member, and a pump effect on the basis of a thread groove (not shown), and seals the oil in a machine inside A on the basis of an appropriate repulsive force (contact force) by the end face lip 62 and the slinger 51.

However, since the pump effect of the slinger 51 is great, and a lot of dusts in a machine outside (an atmospheric air side) B are sucked, the end face lip 62 is damaged, so that there is possibility of generation of an oil leakage.

Further, this kind of sealing device is used as a seal for a diesel engine or a gasoline engine in which the lubricating oil exists in the machine inside. In this case, the end face lip is necessary to be appropriately lubricated by the lubricating oil in the machine inside (refer to WO 2009/125734 A1 or Japanese Unexamined Patent Publication No. 2004-316681).

SUMMARY OF THE INVENTION

Problem to be Solved by the Invention

The present invention is made by taking the above points into consideration, and an object of the present invention is to provide a sealing device constructed by combination of a slinger and a lip member, the sealing device being capable of improving a sealing performance, particularly a sealing performance against external dusts. Further, an object of the present invention is to provide a sealing device having a structure in which an end face lip is hard to be damaged by the external dusts. In addition, an object of the present invention is to provide a sealing device which can retain the leaking oil in the vicinity of the end face lip in the case that the oil in the machine inside leaks from the end face lip, whereby it is possible to lubricate a sliding portion in the end face lip by the oil.

Means for Solving the Problem

In order to achieve the object mentioned above, according to a first aspect of the present invention, there is provided a sealing device comprising a slinger which is installed to one member among relatively rotating two members and a lip member which is installed to the other member, the slinger integrally having a tubular portion which is fitted to the one member and a flange portion which extends in a diametrical direction, and the lip member having an end face lip which slidably comes into close contact with the flange portion, wherein a bent portion protruding in an axial direction toward the lip member is provided in the flange portion, and a labyrinth structure having a minute gap is provided between the bent portion and the lip member.

Further, a sealing device according to a second aspect of the present invention is the sealing device described in the first aspect mentioned above, wherein a lip end is arranged between the bent portion and the tubular portion, a non-contact lip structured such that the non-contact lip does not come into contact with the slinger is provided in the lip member, and the labyrinth structure having the minute gap is provided between the non-contact lip and the slinger.

Further, a sealing device according to a third aspect of the present invention is the sealing device described in the second aspect mentioned above, wherein a lip end is arranged toward the bent portion, a second non-contact lip structured such that the second non-contact lip does not come into contact with the slinger is provided in a root portion of the end face lip, and a space portion generating retention of the dusts is provided between the non-contact lip and the second non-contact lip.

Further, a sealing device according to a fourth aspect of the present invention is the sealing device described in the first, second or third aspect mentioned above, wherein the sealing device is used as a seal for an engine in which a lubricating oil exists in a machine inside.

In the sealing device according to the present invention having the structure mentioned above, since the bent portion protruding in the axial direction toward the lip member is provided in the flange portion, and the labyrinth structure having the minute gap is provided between the bent portion and the lip member, it is possible to inhibit the external dusts from arriving at a leading end portion of the end face lip, on the basis of a seal effect achieved by the labyrinth structure.

Further, in the case that the oil in the machine inside leaks from the end face lip, the leaking oil is retained in the space between the end face lip and the bent portion. Since the labyrinth structure is provided between the bent portion and the lip member, the oil is hard to pass through the labyrinth structure. Therefore, it is possible to appropriately lubricate the sliding portion of the end face lip by the oil which is retained in the space between the end face lip and the bent portion.

Further, in the sealing device according to the present invention, since the lip end is arranged between the bent portion and the tubular portion, the non-contact lip structured such that the non-contact lip does not come into contact with the slinger is provided in the lip member, and the labyrinth structure having the minute gap is provided between the non-contact lip and the slinger, the labyrinth structure can be provided over two positions without increasing the sliding torque. Therefore, it is possible to further improve the sealing performance against the external dusts.

Further, in the sealing device according to the present invention, since the lip end is arranged toward the bent portion, the second non-contact lip structured such that the second non-contact lip does not come into contact with the slinger is provided in the root portion of the end face lip, and the space portion generating the retention of the dusts is provided between the non-contact lip and the second non-contact lip, the dusts can be retained in the space portion. Therefore, it is possible to further improve the sealing performance against the external dusts.

Effect of the Invention

The present invention achieves the following effects.

More specifically, according to the present invention, as mentioned above, it is possible to inhibit the external dusts from arriving at the leading end portion of the end face lip on the basis of the sealing effect achieved by the labyrinth structure, and the sealing effect by the retention of the dusts in the space portion. Therefore, since it is possible to inhibit the end face lip from being damaged by the external dusts, and the sealing performance of the end face lip can be maintained over a long time, it is possible to maintain an oil leakage suppression effect which is an inherent function of the end face lip over a long time.

Further, since the leaking oil is retained in the vicinity of the end face lip in the case that the oil in the machine inside leaks from the end face lip, it is possible to lubricate the sliding portion of the end face lip by the oil. Therefore, it is possible to inhibit the end face lip from being damaged by an insufficient lubrication.

DETAILED DESCRIPTION OF PREFERRED EMBODIMENTS

The following embodiments are included in the present invention.

(1) A turned-back portion is provided in the slinger, thereby providing a labyrinth effect between the turned-back portion and the lip. Therefore, it is possible to prevent the dusts from arriving at the leading end of the end face lip.

(2) Further, a non-contact lip is provided in a spindle side, whereby the labyrinth structures can be provided at two positions without increasing any torque. Therefore, it is possible to further expect the improvement of the dust resistance.

(3) The same labyrinth effect can be expected only by bending the slinger at a certain angle. The intruding dusts can be retained by a pocket (a space portion) between the lip (the second non-contact lip) and the spindle side lip (the non-contact lip) by adding the non-contact lip (the second non-contact lip) to the end face lip and aligning the bending angle of the slinger and the angle of the lip (the second non-contact lip), thereby preventing the dust from intruding to the leading end of the end face lip.

(4) According to the present invention, it is possible to expect the improvement of the external dusts resistance of the end face lip, and it is possible to achieve the improvement of the oil leakage and the improvement of a vehicle service life.

Figure 3:
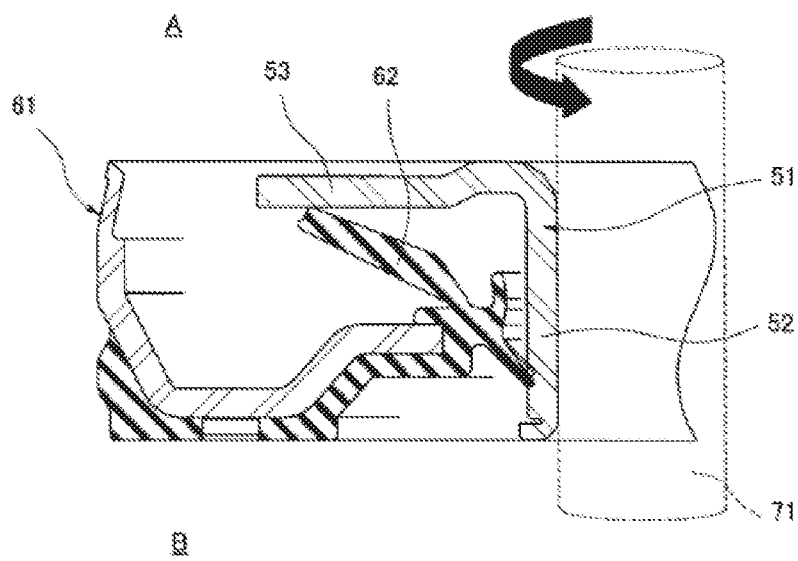
FIG. 3 is a cross sectional view of a substantial part of a sealing device according to a prior art.

(5) The oil seal of the type shown in FIG. 3 is mainly used as the oil seal for the diesel engine, and a material of the seal lip is constructed by a silicone rubber, an acrylic rubber or a fluorine-contained rubber (FKM) which is a high-quality material. Further, in recent years, there has been made a study of development of the use of this type of oil seal in the gasoline engine for the purpose of making the torque of the sliding portion of the seal lip low. Here, in the gasoline engine, a heat resistance is demanded for the reason that the used rotating speed is high, and the silicone rubber has a problem in the durability. As a result, the fluorine-contained rubber (FKM) is exclusively used. However, the fluorine-contained rubber (FKM) badly familiarizes itself with the lubricating oil, and there is fear that the oil leaking from the end face lip (the side lip) immediately flows out to the radial lip (the dust lip) side. Then, the present invention is structured such that the leaking oil is retained in the vicinity of the end face lip (the side lip) in the oil seal which is constructed by the fluorine-contained rubber (FKM) for the gasoline engine.

Embodiments

Next, a description will be given of embodiments according to the present invention with reference to the accompanying drawings.

First Embodiment

Figure 1:
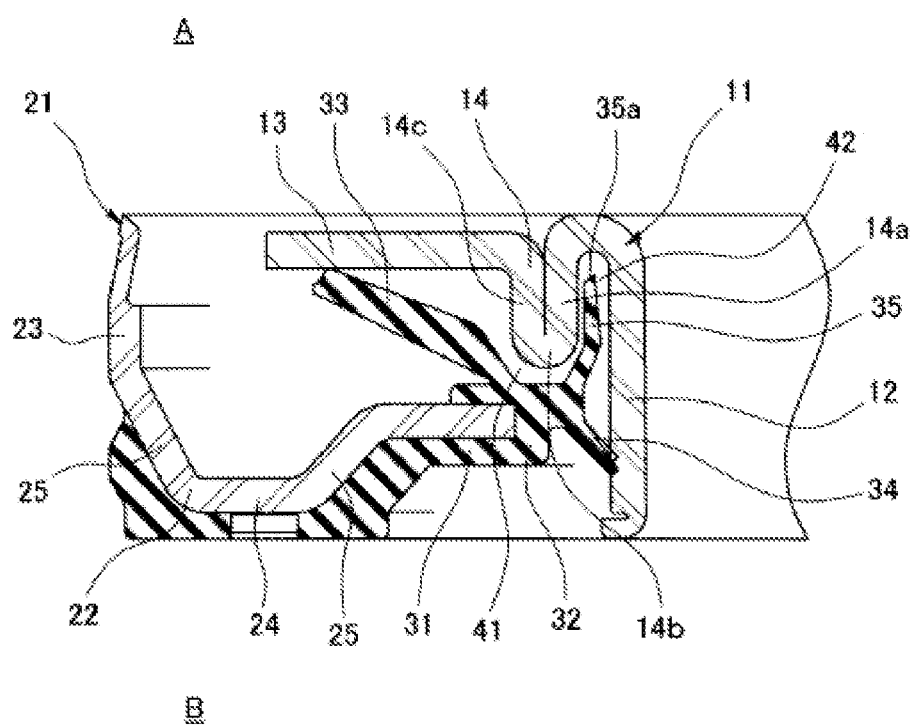
FIG. 1 is a cross sectional view of a substantial part of a sealing device according to a first embodiment of the present invention.

FIG. 1 shows a cross section of a substantial part of a sealing device according to a first embodiment of the present invention. The sealing device according to the embodiment is used as an engine seal in an automobile-related field, for example. The sealing device inhibits an oil in a machine inside A from leaking to a machine outside B and inhibits external dusts in the machine outside B from intruding into the machine inside A. Further, the sealing device according to the embodiment is preferably used as a seal for a diesel or gasoline engine in which the lubricating oil exists in the machine inside A.

The sealing device according to the embodiment has a slinger 11 which is installed to one member (for example, a spindle, not shown) among two relatively rotating members, and a lip member 21 which is installed to the other member (for example, a spindle housing, not shown), and is constructed by combination of them.

The slinger 11 is constructed by a metal material, is structured such that a flange portion (an outward flange portion) 13 is integrally formed in an end portion in one side (the machine inside A side) in an axial direction of a tubular portion 12 so as to be directed to an outer side in a diametrical direction, and is fitted to an outer peripheral surface of the one member by an inner peripheral surface of the tubular portion 12.

The lip member 21 has an attachment ring 22, and a rubber-like elastic body 31 which is attached (bonded) to the attachment ring. The attachment ring 22 is constructed by a metal material, is structured such that a flange portion (an inward flange portion) 24 is integrally formed in an end portion in the other (the machine outside B side) in an axial direction of a tubular portion 23 so as to be directed to an inner side in the diametrical direction, and is fitted to an inner peripheral surface of the other member by an outer peripheral surface of the tubular portion 23. The flange portion may be provided with a taper surface 25 as shown.

The rubber-like elastic body 31 integrally has an attached rubber portion 32 which is attached to the attachment ring, an end face lip (a side lip) 33 which is supported to the attached rubber portion 32 and slidably comes into close contact with an end surface in the axial direction of the flange portion 13 of the slinger 11, and a radial lip (a dust lip) 34 which is supported to the attached rubber portion 32 in the same manner and slidably comes into close contact with an outer peripheral surface of the tubular portion 12 of the slinger 11. The end face lip 33 is structured such as to mainly seal the oil in the machine inside A, and directs a lip end toward an outer side in the diametrical direction in the machine inside A side, for achieving the sealing function. The radial lip 34 is structured such as to mainly seal the external dusts in the machine outside B, and directs a lip end toward the other side in the axial direction in the machine outside B side, for achieving the sealing function.

Further, the sealing device according to the embodiment has the following structures as the further features.

(A)

An annular bent portion 14 protruding toward the lip member 21, that is, toward the other side in the axial direction is provided in the flange portion 13 of the slinger 11 while being positioned in an inner peripheral side of the end face lip 33, and a labyrinth structure 41 having a minute gap is provided between the bent portion 14 and the lip member 21. The minute gap is provided as a gap in an axial direction between the bent portion 14 and the attached rubber portion 32, and is also provided as a gap in a diametrical direction between the bent portion 14 and a root portion of the end face lip 33, the gap in the diametrical direction being continuously provided with the gap in the axial direction. The bent portion 14 is formed into an approximately U-shaped cross section as a whole, and is constructed by combination of an inner peripheral tubular portion 14a, an inverting portion 14b which inverts over about 180 degrees, and an outer peripheral tubular portion 14c. An outer peripheral surface of the inner peripheral tubular portion 14a and an inner peripheral surface of the outer peripheral tubular portion 14c are in contact with each other. Each of an inner peripheral surface of the inner peripheral tubular portion 14a and an outer peripheral surface of the outer peripheral tubular portion 14c is formed into a cylindrical surface which is straight in the axial direction.

(B)

A lip end 35a is arranged between the bent portion 14 and the tubular portion 12 in the slinger 11, and a non-contact lip 35 structured such that the non-contact lip 35 does not come into contact with the slinger 11 is provided in the rubber-like elastic body 31 of the lip member 21 so as to be positioned in an inner peripheral side of the bent portion 14. Further, a labyrinth structure 42 having a minute gap is provided between the non-contact lip 35 and the slinger 11. The minute gap is provided as a gap in a diametrical direction between the non-contact lip 35 and the tubular portion 12, and is also provided as a gap in a diametrical direction between the non-contact lip 35 and the bent portion 14, this gap being connected to the former gap. The non-contact lip 35 is provided so as to be directed to one side in the axial direction as a whole.

In the sealing device having the structure mentioned above, since the bent portion 14 protruding toward the lip member 21 is provided in the flange portion 13 of the slinger 11, and the labyrinth structure 41 having the minute gap is provided between the bent portion 14 and the lip member 21, it is possible to inhibit the external dusts from arriving at the leading end portion of the end face lip 33 on the basis of a sealing effect achieved by the labyrinth structure 41.

Further, since the lip end 35a is arranged between the bent portion 14 and the tubular portion 12 in the slinger 11, the non-contact lip 35 structured such that the non-contact lip 35 does not come into contact with the slinger 11 is provided in the lip member 21, and the labyrinth structure 42 having the minute gap is provided between the non-contact lip 35 and the slinger 11, the labyrinth structures 41 and 42 can be provided totally over two positions without increasing any sliding torque. Therefore, it is possible to further improve the sealing performance against the external dusts.

As a result, it is possible to inhibit the end face lip 33 from being damaged by the external dusts, and the sealing performance of the end face lip 33 can be maintained over a long time. Therefore, it is possible to maintain an effect of suppressing an oil leakage which is an original function of the end face lip 33 over a long time.

Describing additionally, it is preferable to employ a silicone rubber, a fluorine-contained rubber (FKM), a nitrile rubber or an acrylic rubber as a material for the rubber-like elastic body 31 including the end face lip 33, the non-contact lip 35 and the radial lip 34, and particularly employ the fluorine-contained rubber (FKM) in the light of a high-temperature durability particularly in the case that the sealing device is used as the seal for the gasoline engine. However, since an affinity to the lubricating oil is low in the fluorine-contained rubber (FKM), there is fear that the lubricating oil filtering out of the end face lip 33 easily flows out to the radial lip 34 side. According to the sealing device, the filtering lubricating oil is retained in the space which is formed by the end face lip 33 and the bent portion 14 (the space from the lip end of the end face lip 33 over the bent portion 14 to the labyrinth structures 41 and 42). Therefore, it is possible to inhibit the problem (the torque increase or the abrasion generation) due to the lack of the lubricating oil from being generated in the sliding surface of the end face lip 33. Further, in order to further promote the operation and effect, a thread or a groove for returning the lubricating oil to the sliding surface may be provided in the sliding surface of the end face lip 33 or the flange portion 13, and from the sliding surface over the radial lip 34 side (the inner peripheral side).

Second Embodiment

Figure 2:
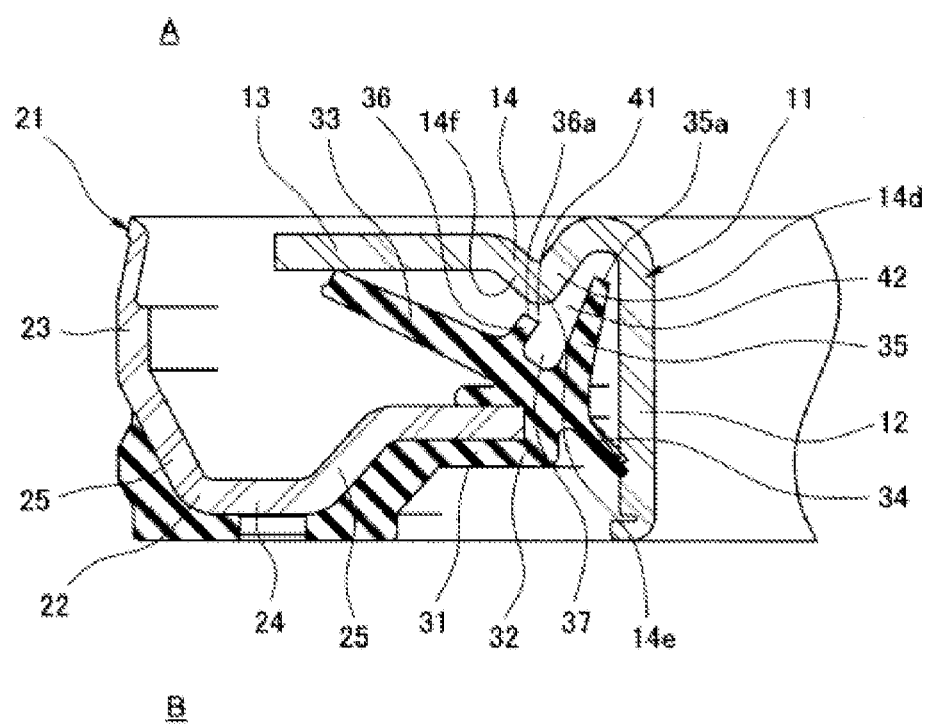
FIG. 2 is a cross sectional view of a substantial part of a sealing device according to a second embodiment of the present invention.

FIG. 2 shows a cross section of a substantial part of a sealing device according to a second embodiment of the present invention. The sealing device according to the embodiment is used as an engine seal in an automobile-related field, for example. The sealing device inhibits an oil in a machine inside A from leaking to a machine outside B and inhibits external dusts in the machine outside B from intruding into the machine inside A. Further, the sealing device according to the embodiment is preferably used as a seal for a diesel or gasoline engine in which the lubricating oil exists in the machine inside A.

The sealing device according to the embodiment has a slinger 11 which is installed to one member (for example, a spindle, not shown) among two relatively rotating members, and a lip member 21 which is installed to the other member (for example, a spindle housing, not shown), and is constructed by combination of them.

The slinger 11 is constructed by a metal material, is structured such that a flange portion (an outward flange portion) 13 is integrally formed in an end portion in one side (the machine inside A side) in an axial direction of a tubular portion 12 so as to be directed to an outer side in a diametrical direction, and is fitted to an outer peripheral surface of the one member by an inner peripheral surface of the tubular portion 12.

The lip member 21 has an attachment ring 22, and a rubber-like elastic body 31 which is attached (bonded) to the attachment ring. The attachment ring 22 is constructed by a metal material, is structured such that a flange portion (an inward flange portion) 24 is integrally formed in an end portion in the other (the machine outside B side) in an axial direction of a tubular portion 23 so as to be directed to an inner side in the diametrical direction, and is fitted to an inner peripheral surface of the other member by an outer peripheral surface of the tubular portion 23. The flange portion may be provided with a taper surface 25 as shown.

The rubber-like elastic body 31 integrally has an attached rubber portion 32 which is attached to the attachment ring, an end face lip (a side lip) 33 which is supported to the attached rubber portion 32 and slidably comes into close contact with an end surface in the axial direction of the flange portion 13 of the slinger 11, and a radial lip (a dust lip) 34 which is supported to the attached rubber portion 32 in the same manner and slidably comes into close contact with an outer peripheral surface of the tubular portion 12 of the slinger 11. The end face lip 33 is structured such as to mainly seal the oil in the machine inside A, and directs a lip end toward an outer side in the diametrical direction in the machine inside A side, for achieving the sealing function. The radial lip 34 is structured such as to mainly seal the external dusts in the machine outside B, and directs a lip end toward the other side in the axial direction in the machine outside B side, for achieving the sealing function.

Further, the sealing device according to the embodiment has the following structures as the further features.

(A)

An annular bent portion 14 protruding toward the lip member 21, that is, toward the other side in the axial direction is provided in the flange portion 13 of the slinger 11 while being positioned in an inner peripheral side of the end face lip 33, and a labyrinth structure 41 having a minute gap is provided between the bent portion 14 and the lip member 21. The minute gap is provided as a gap in an axial direction between the bent portion 14 and a second non-contact lip 36 mentioned later. The bent portion 14 is formed into an approximately V-shaped cross section as a whole, and is constructed by combination of an inner peripheral taper portion 14d, an inverting portion (a top portion) 14e and an outer peripheral taper portion 14f.

(B)

A lip end 35a is arranged between the bent portion 14 and the tubular portion 12 in the slinger 11, and a non-contact lip 35 structured such that the non-contact lip 35 does not come into contact with the slinger 11 is provided in the rubber-like elastic body 31 of the lip member 21 so as to be positioned in an inner peripheral side of the bent portion 14. Further, a labyrinth structure 42 having a minute gap is provided between the non-contact lip 35 and the slinger 11. The minute gap is provided as a gap in a diametrical direction between the non-contact lip 35 and the tubular portion 12, and is also provided as a gap in a diametrical direction between the non-contact lip 35 and the bent portion 14, this gap being connected to the former gap. The non-contact lip 35 is provided so as to be directed to one side in the axial direction as a whole.

(C)

Further, a lip end 36a is arranged toward the bent portion 14, the second non-contact lip 36 structured such that the second non-contact lip 36 does not come into contact with the slinger 11 is provided by the rubber-like elastic body 31 of the lip member 21 so as to be positioned in an inner peripheral surface of a root portion of the end face lip 33, and an annular space portion 37 generating retention of the dusts is provided between the second non-contact lip 36 and the non-contact lip 35 as a valley-like structure between both the lips 35 and 36.

In the sealing device having the structure mentioned above, since the bent portion 14 protruding toward the lip member 21 is provided in the flange portion 13 of the slinger 11, and the labyrinth structure 41 having the minute gap is provided between the bent portion 14 and the lip member 21, it is possible to inhibit the external dusts from arriving at the leading end portion of the end face lip 33 on the basis of a sealing effect achieved by the labyrinth structure 41.

Further, since the lip end 35a is arranged between the bent portion 14 and the tubular portion 12 in the slinger 11, the non-contact lip 35 structured such that the non-contact lip 35 does not come into contact with the slinger 11 is provided in the lip member 21, and the labyrinth structure 42 having the minute gap is provided between the non-contact lip 35 and the slinger 11, the labyrinth structures 41 and 42 can be provided totally over two positions without increasing any sliding torque. Therefore, it is possible to further improve the sealing performance against the external dusts.

Further, since the lip end 36a is arranged toward the bent portion 14, the second non-contact lip 36 structured such that the second non-contact lip 36 does not come into contact with the slinger 11 is provided in the root portion of the end face lip 33, and the space portion 37 generating the retention of the dusts is provided between the non-contact lip 35 and the second non-contact lip 36, it is possible to retain the dusts in the space portion 37. Therefore, it is possible to further improve the sealing performance against the external dusts.

As a result, it is possible to inhibit the end face lip 33 from being damaged by the external dusts, and the sealing performance of the end face lip 33 can be maintained over a long time. Therefore, it is possible to maintain an effect of suppressing an oil leakage which is an original function of the end face lip 33 over a long time.

In order to sufficiently achieve the dust retention effect by the space portion 37, it is desirable for the dusts intruding through the gap in the diametrical direction between the non-contact lip 35 and the bent portion 14 according to the structure (B) to enter into the space portion 37 as it is without changing the intruding direction. Therefore, the space portion 37 is preferably provided on an extension of the gap in the diametrical direction between the non-contact lip 35 and the bent portion 14. Accordingly, it is preferable to set the second non-contact lip 36 on the extension of the inner peripheral taper portion 14d of the bent portion 14, and bring or approximately bring an angle of incline of the second non-contact lip 36 (an angle of incline in relation to a center axis of the sealing device) into line with an angle of incline of the inner peripheral taper portion 14d (same as above).

Further, it is preferable to employ a silicone rubber, a fluorine-contained rubber (FKM), a nitrile rubber or an acrylic rubber as a material for the rubber-like elastic body 31 including the end face lip 33, the non-contact lip 35 and the radial lip 34, and particularly employ the fluorine-contained rubber (FKM) in the light of a high-temperature durability particularly in the case that the sealing device is used as the seal for the gasoline engine. However, since an affinity to the lubricating oil is low in the fluorine-contained rubber (FKM), there is fear that the lubricating oil filtering out of the end face lip 33 easily flows out to the radial lip 34 side. According to the sealing device, the filtering lubricating oil is retained in the space which is formed by the end face lip 33 and the bent portion 14 (the space from the lip end of the end face lip 33 over the bent portion 14 to the labyrinth structures 41 and 42). Therefore, it is possible to inhibit the problem (the torque increase or the abrasion generation) due to the lack of the lubricating oil from being generated in the sliding surface of the end face lip 33. Further, in order to further promote the operation and effect, a thread or a groove for returning the lubricating oil to the sliding surface may be provided in the sliding surface of the end face lip 33 or the flange portion 13, and from the sliding surface over the radial lip 34 side (the inner peripheral side).

What is claimed is:

1. A sealing device comprising:
    a slinger which is installed to one member among two relatively rotating members;
    a lip member which is installed to the other member among the two relatively rotating members;
    said slinger integrally having a tubular portion which is fitted to said one member and a flange portion which extends in a diametrical direction; and
    said lip member having an end face lip which slidably contacts said flange portion,
    wherein a bent portion protrudes in an axial direction from said flange portion so as to be circumferentially juxtaposed with said tubular portion,
    wherein said bent portion has an approximately U-shaped cross section as a whole, and is constructed by an inner peripheral tubular portion, an inverting portion which inverts over about 180 degrees, and an outer peripheral tubular portion,
    wherein an outer peripheral surface of the inner peripheral tubular portion and an inner peripheral surface of the outer peripheral tubular portion are in contact with each other,
    wherein each of an inner peripheral surface of the inner peripheral tubular portion and the outer peripheral surface of the outer peripheral tubular portion is a cylindrical surface which is straight in the axial direction,
    wherein said lip member includes a non-contact lip extending between said inner peripheral surface of said inner peripheral tubular portion of said bent portion and said tubular portion of said slinger, an entirety of said non-contact lip not contacting said slinger, said non-contact lip terminating at a lip end circumferentially spaced apart from said inner peripheral surface of said inner peripheral tubular portion of said bent portion and said tubular portion of said slinger,
    wherein a first labyrinth structure having first gap is provided between said inverting portion of said bent portion and said lip member proximate a root portion of said end face lip, and
    wherein a second labyrinth structure including a second gap is continuously provided between said inner peripheral surface of said inner peripheral tubular portion of said bent portion and said non-contact lip and between said non-contact lip and said tubular portion of said slinger.

2. The sealing device according to claim 1, wherein a lip end is arranged toward said bent portion, a second non-contact lip structured such that the second non-contact lip does not come into contact with said slinger is provided in a root portion of said end face lip, and
    wherein a space portion generating retention of the dusts is provided between said non-contact lip and said second non-contact lip.

3. The sealing device according to claim 1, wherein said sealing device is used as a seal for an engine in which a lubricating oil exists in a machine inside.

4. The sealing device according to claim 2, wherein said sealing device is used as a seal for an engine in which a lubricating oil exists in a machine inside.

* * * * *